3,157,362
DEVICE FOR PRODUCING A STRONG PHOTO-
         LUMINESCENT LIGHT
Moustapha Waly, Geneva, Switzerland, assignor to
    Anicet Anstalt, Vaduz, Liechtenstein
       Filed July 6, 1962, Ser. No. 207,999
Claims priority, application Switzerland, June 4, 1962,
                    6,844/62
            21 Claims. (Cl. 240—20)

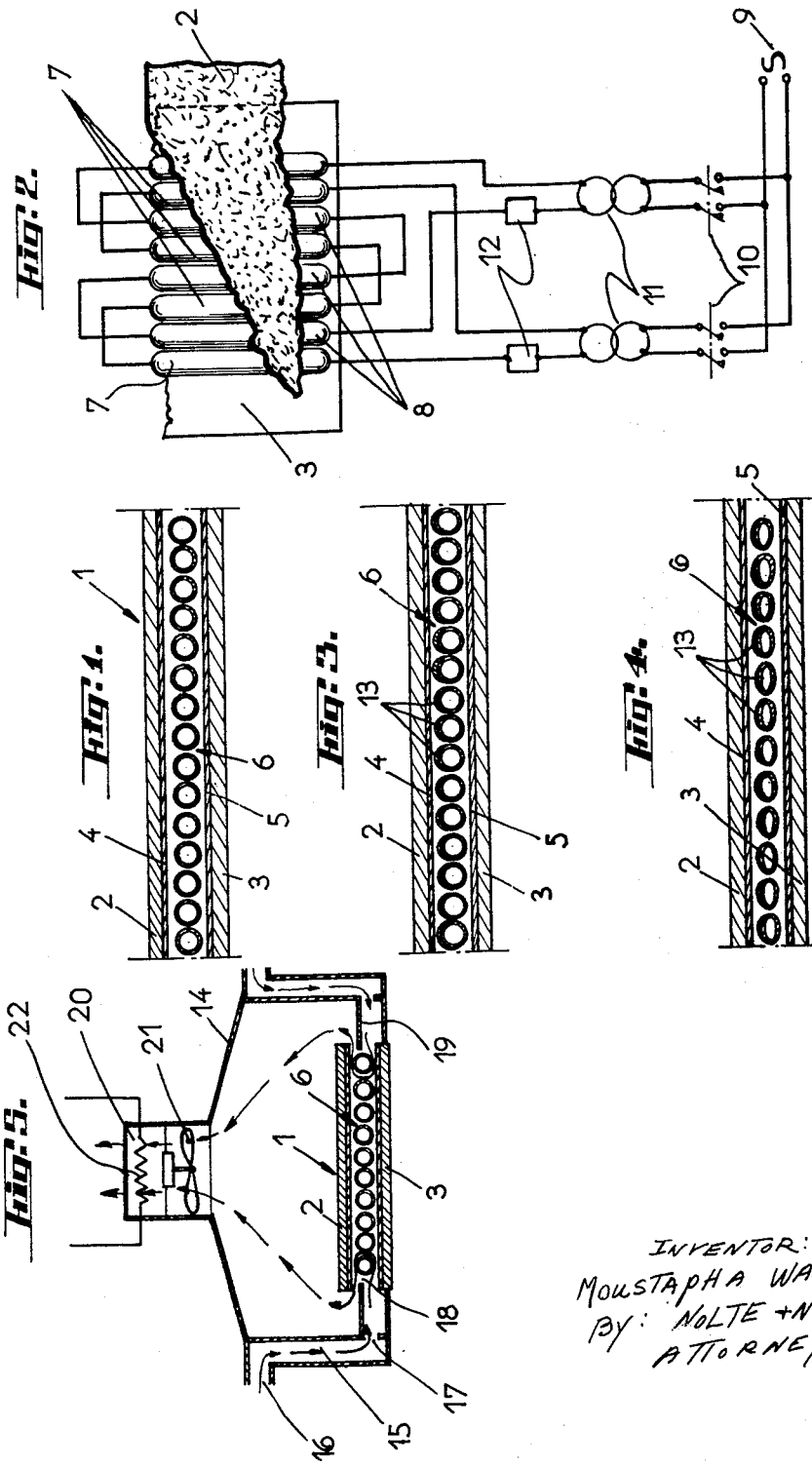

It is the essential object of this invention to provide a method of producing a diffused-light strong photoluminescent lighting, a device constituting a photoluminescent lamp for carrying out said method, and the practical applications of said method and device to the field reproduction, photoengraving and photographic reproduction in general.

It is known that in the conventional technique of photographic enlargement or reproduction of photographic documents in general it is necessary to have a strongly illuminated surface area in which the illumination is as uniform as possible. In the present state of the art it is requisite to interpose between the light source and the document or documents to be illuminated a translucent or diaphanous glass of the ground type, or an opaline glass developed more recently. It is known that these ground glass plates, due to the fact that they diffuse the light from the source instead of transmitting it directly by transparency, exhibit a diffused optical density which may easily reach a value of $D=.7$, which means that only about 20% of the quantity of light from the light source will be received by the document to be reproduced or enlarged.

If, in addition, the lens system of the enlarger is adjusted to a diaphragm value of $F=16$ or $F=22$, the weakening of the light received becomes considerable and the exposure time necessary for a proper operation may be in the range of several minutes and often exceeds half-an-hour in certain special works, for instance in photoengraving and the like. Of course, this is considered as a serious drawback from the standpoint of the economical operation of a laboratory. Therefore, it is necessary to take due account of the distortion of the Hurter and Driffield sensitometric characteristic curve owing to the very low level of illumination applied to the photosensitive layer receiving the light through the image of the projected and enlarged document.

It is the essential object of the present invention to avoid the drawbacks broadly set forth hereinabove and to produce a much stronger light over a uniformly illuminated surface area.

Photoluminescent illumination methods and apparatus are known which emit a visible light flux when a layer of fluorescent materials is excited by electromagnetic radiations from a suitable source. The method according to the present invention is characterized in that it consists on the one hand in reflecting in the desired and useful direction that portion of the light emitted by said layer in the opposite direction, by means of at least another layer of said fluorescent materials which is spaced from but relatively close to the first layer, and on the other hand in amplifying the light produced by said first layer by the light make-up delivered by said other layer which is also excited simultaneously by said radiations.

According to another feature characterizing this invention, a substantially uniform luminous surface area is obtained by diffusing the aforesaid emitted light through a translucent diopter of a kind already known per se, of which the diffused opacity is compensated for by applying said first layer of fluorescent materials directly on the surface of said diopter.

This invention is also concerned with a high-power illuminating device acting as a photoluminescent lamp and designed for carrying out the method broadly set forth hereinabove, this device being characterized in that it comprises an enclosure forming a relatively flat light-reflecting and integrating chamber or the like which contains the aforesaid source of electromagnetic radiations and of which at least one portion (having preferably a substantially flat or plane surface) is adapted to diffuse the light.

According to another feature of this invention the aforesaid light integrating chamber comprises two opposite, relatively close-spaced walls consisting of two plates or the like which are preferably flat, parallel and coated respectively on their registering inner faces with a layer of fluorescent materials hereinafter called "phosphors."

According to still another feature characterizing this invention at least one of said plates is translucent.

According to a further feature of this invention said translucent plate consists of translucent glass or the like which is selected from the group comprising ground glasses and opaline glasses, and carries on its inner face a thin layer of phosphor-forming substances of a thickness ranging from 10 to 30 microns for compensating for the diffused or opalescent opacity of said plate.

The fluorescent materials or powders known under the general term of "phosphors" are so selected that their excitation lies in the ultra-violet portion of the electromagnetic spectrum.

According to another feature of this invention the aforesaid source of electromagnetic radiations acts as an ultra-violet-ray generator and consists of a set or bank of at least one group of electric discharge tubes of substantially cylindrical configuration, which are of the mercury vapour type, this set being mounted in the available space left between said two plates, the tubes being connected in series and producing ultra-violet radiations of 2537 A. wavelength, said phosphor-forming substances, which are preferably stable and of inorganic origin, being so selected as to have the maximum photosensitivity for the spectrum line corresponding to said wavelength. These discharge tubes contains mercury vapour under a relatively low pressure and their walls consists of special glass transmitting by transparency nearly all of the 2537 A. radiations produced as a consequence of the excitation of the mercury vapour by the electric discharge.

With this arrangement it is possible, due to the multiple reflecting effect, to produce an intense light uniformly diffused and well suitable for works such as photo-engraving and the like.

This invention also relates to the various practical applications of the high-power lighting device broadly set forth hereinabove to the fields of photo-engraving and photographic reproductions in general.

Other features and advantages of this invention will appear as the following description proceeds with reference to the accompanying drawing illustrating diagrammatically by way of example a few typical embodiments of the means constituting the subject-matter of this invention. In the drawing:

FIGURE 1 is a diagrammatic section taken across the light-integrating chamber according to this invention;

FIGURE 2 illustrates diagrammatically in plan view the aforesaid light-integrating chamber with parts broken away;

FIGURE 3 is a section similar to FIGURE 1 showing a modified embodiment of the light-integrating chamber;

FIGURE 4 is a section similar to FIGURES 1 and 3, showing another alternate embodiment of the light-integrating chamber, and FIGURE 5 is a diagrammatic cross-section at a smaller scale illustrating a complete lighting device constructed according to the teachings of this invention.

Referring first to the form of embodiment of the invention which is shown in FIGURE 1 of the drawing, the light-integrating chamber 1 comprises two substantially parallel plates designated by the reference numerals 2 and 3 respectively; these plates are closely spaced, for example at a relative spacing of about 50 mm. or less. The upper plate 2 may consist of opaque glass or metal sheet and carries a layer of finely divided material of fluorescent power 4 on its inner face. The opposite plate 3 is generally made of ground glass or opaline glass and is similarly coated on its inner face with a phosphor layer 5.

Disposed in the space provided between the two plates is a set of cylindrical electric discharge tubes 6 of the mercury vapour type, adapted to emit preferably 2537 A. wavelength ultra-violet rays. In conjunction therewith, the phosphor layers 4, 5 are selected to have the maximum photosensitivity at this spectrum line. This set of electric discharge tubes is preferably of flat configuration forming for example a grid-like pattern and is substantially parallel to said pair of plates laying on either side of the set, and the adjacent tubes are juxtaposed in parallel side-by-side relationship and as close as possible to each other to form a tightly packed row preferably without any gap therebetween, so that adjacent tubes be contiguous or contact each other within reasonable limits.

All the tubes constituting the set 6 are advantageously connected in series and energized from a suitable source of alternating current. However, to avoid noxious stroboscopic effects, the set of tubes 6 preferably consists of at least two separate groups of tubes 7 and 8 which are disposed in alternate or imbricate relative arrangement whereby two successive tubes of one group are separated from each other by a tube belonging to the other group, and the tubes of each separate group are connected in series with one another so that each group is energized separately from the aforesaid source 9 of alternating current. These separate power supplies are obtained preferably through the medium of known line breakers 10, static transformers 11 and current phase-shift devices 12 inserted in one or both feed lines and adapted to provide the phase shift required for avoiding the aforesaid detrimental stroboscopic effects (see FIGURE 2).

The side walls of the tubes constituting the set 6 may also be coated, preferably externally, throughout their length and at least one portion of their periphery, with a layer of phosphors 13. In FIGURE 3, it is apparent that this additional layer is applied on that portion of the tube periphery which registers with the plate 2, for example along one third of the tube periphery, this phosphor layer having likewise a maximum sensitivity for the 2537 A. spectrum line. In conjunction therewith, the phosphor-forming substances deposited on the plates and tubes and particularly on plate 2 are advantageously selected to have a high neutral reflection factor through a wide range of the spectrum, even in the ultraviolet region thereof; thus, they have a white or grey neutral colour improving the reflection of the ultra-violet rays not absorbed by the phosphor layer carried by the tubes.

The aforesaid tubes are preferably of a diameter as small as possible, for example of a minimum value of about 15 mm., and they operate under a rated voltage as low as possible and therefore with a current as high as possible, for example of the order of .45 to 1.2 A. A typical embodiment may comprise for example discharge tubes spaced about 8 mm. from the upper reflecting plate 2 and about 16 mm. from th lower translucent plate 3.

According to an alternate embodiment illustrated in FIGURE 4 the tubes 6 may have an oval cross-section, for example of lenticular configuration, which promotes a better distribution of the generated and reflected light without impairing or sacrificing the high current density through the tubes. The outer faces of these oval-sectioned tubes which register with the upper plate 2 are also coated with a layer of a suitable phosphor composition but along a greater fraction of their periphery than in the case of the circular or round section shown in FIGURE 3, as the lenticular section is more advantageous since it provides a greater luminous surface area in close vicinity of the operating arc.

The fact that the aforesaid phosphor layer is applied on the outer faces of the tubes is considerably advantageous as compared with conventional fluorescent tubes in that the mercury vapour does not directly contact the phosphor binders. In effect, in a conventional fluorescent tube the phosphor layer is usually deposited on the inner face of the tube wall by using an organic liquid which is subsequently destroyed and evaporated by means of a suitable treatment in an oven at a relatively high temperature, whereby it is very difficult to get rid of the traces of residual binders. In this case, brownish spots appear on the tube walls due to the reaction of the mercury with these traces of non-destroyed volatile substances. This drawback is removed with the tubes of this invention for the mercury is completely isolated by the tube wall from the phosphor deposits which are themselves caused to adhere on the outer wall of the tubes by means of a liquid inorganic salt such as sodium silicate or the like.

The plates 2 and 3 are preferably detachable and interchangeable, whereby the emission colour of the phosphors of the lamp may easily be modified by simply changing the plates supporting these fluorescent powders.

It may also be noted that the diffused optical density of the ground glass constituting for example the lower plate 3 is actually compensated for by the application of the aforesaid thin phosphor layer.

The walls of the electric discharge tubes should be kept at a predetermined specified temperature in order to preserve the maximum transparency for the 2537 A. spectrum line, that is, such a temperature that the absorption of this line by the tube wall is kept to a minimum. To this end, controllable cooling means consisting preferably of a forced-ventilation system are provided.

FIGURE 5 illustrates a typical form of embodiment of a lighting device according to this invention. This device comprises an outer casing 14 forming a practically closed housing containing the aforesaid flat chamber 1 consisting of the two plates 2, 3 between which the set of electric discharge tubes 6 is disposed. The lower plate 3 is disposed in a corresponding aperture formed in the casing 14 so as to constitute a kind of window in the wall thereof. This casing 14 comprises on its lateral periphery a jacket-like double wall or similar structure to provide an annular space or passage 15 opening in the outer atmosphere, for example at its upper portion 16, and communicating with the inner space of the casing 14, for example at its lower portion 17, in order to provide a kind of baffled passage way for the external air entering the apparatus. The upper reflecting plate 2 is preferably disposed just above the aperture 18 formed in a transverse partition 19 of the apparatus in order to likewise constitute a baffled passage for the ventilation air which, after flowing through the set of tubes 6 to be cooled, escapes upwards. This hot air may be discharged externally through an orifice 20 preferably located in the upper portion of the apparatus and surrounding a fan or like device 21 adapted, by forced or induced draught, to establish the formed circulation of the air drawn through the space 14 from inside and exhausted to the outside through the aforesaid orifice 20.

Means are provided for destroying any ozone released during the operation of the discharge tubes. In the specific form of embodiment shown these means may consist of electrical heating resistances 22 disposed across the orifice 20 and heated to a temperature of about 250° C. (482° F.) at which the ozone is instantaneously destroyed by decomposition.

This device operates as follows:

The electromagnetic emission of 2537 A. wavelength ultraviolet radiations excites the phosphor layer applied on the two registering inner faces of plates 2 and 3, and also if desired, on the tube walls, whereby these layers become photoluminescent and generate the type of light consistent with the specific application or task contemplated, for example with the photographic emulsion to be exposed. A reflection will thus take place between the two close-spaced plates and the reflected rays will pass through the emitter tubes of which the walls are transparent to 2537 A. ultraviolet rays and also to the useful light generated by the phosphor ayers. These reflections through the tubes and in the presence of close-spaced walls excited in turn and reflecting the various radiations will thus produce so to say a light mixture which is ideal for the regular and uniform distribution of the illumination.

Of course, the invention should not be construed as being limited to the specific forms of embodiment described and illustrated herein by way of example only. Thus, many modifications and variations may be brought to single parts and assemblies when carrying out the invention, without however departing from the scope of the invention as set forth in the appended claims.

What I claim is:

1. A lighting device acting as a photoluminescent lamp and comprising a relatively flat chamber formed with two opposite, relatively closely spaced walls consisting of two substantially plane and parallel plates leaving a gap therebetween and coated on their confronting inner faces respectively with a phosphor-forming layer of stable fluorescent substances of inorganic origin selected to have their maximum photosensitivity for the radiation of 2537 angstroms wavelength, at least one of said plates being made of translucent light-diffusing glass selected from the group including ground glasses and opaline glasses and the thickness of the phosphor-forming layer on said translucent plate ranging from 10 to 30 microns, a source of electromagnetic radiations consisting of a set of at least one group of cylindrical electric discharge tubes of the mercury vapor type generating an emission of ultra-violet rays of 2537 angstroms wavelength, said tubes being connected in series and located in the gap left between said two plates, and means for destroying the ozone produced during the operation of said tubes.

2. A device according to claim 1 wherein said set of tubes is of substantially grid-like and flat configuration and substantially parallel to said two plates, said tubes being juxtaposed in parallel and side-by-side relationship to each other so as to form a row as tightly packed as possible with the tubes contacting each other.

3. A device according to claim 2, wherein said set of tubes consists of at least two distinct groups of mutually imbricated tubes whereby two successive tubes of one group are separated by a tube pertaining to the other group, the tubes of each group being connected in series and each group being separately energized through a static transformer and a current phase-shifting device.

4. A device according to calim 1, wherein the diameter of said tubes is minimum and about 15 mm. and said tubes operate with a current strength of the order .45 to 1.2 amperes under an operating voltage as low as possible.

5. A device according to claim 1, wherein the lateral walls of said tubes are coated externally throughout their length and over at least one portion of their periphery with a layer of said phosphor-forming substances.

6. A device according to claim 5, wherein said tubes have an oval-shaped cross-section with a substantially lenticular contour.

7. A device according to claim 1, comprising means for effecting the controlled cooling of the wall of said tubes, and consisting of a forced-ventilation system.

8. A device according to claim 1, comprising an outer casing forming an enclosure containing said flat chamber of which said translucent plate constitutes a window in the wall of said casing including outlet means and, said casing being laterally surrounded by a duct formed integral therewith and constituting an annular jacket, inlet means for said duct opening into the outer atmosphere, baffle means whereby said duct communicates with the inner space of said casing through said chamber and a fan for effecting a forced circulation of air whereby the air is drawn inwards from outside through said inlet means, said jacket, said chamber and said casing and discharged outwards through said outlet means.

9. A device according to claim 1, wherein said plates are detachable and interchangeable, whereby the emission colour may be changed at will.

10. A lighting device acting as a photoluminescent lamp and comprising a relatively flat chamber formed with two opposite, relatively closely spaced walls consisting of two substantially plane and parallel plates leaving a gap therebetween and coated on their confronting inner faces respectively with a phosphor-forming layer of stable fluorescent substances, of inorganic origin selected to have their maximum photosensitivity for the radiation of 2537 angstroms wavelength, at least one of said plates being made of translucent light-diffusing glass selected from the group including ground glasses and opaline glasses and the thickness of the phosphor-forming layer on said translucent plate ranging from 10 to 30 microns, a source of electromagnetic radiations consisting of a set of at least one group of cylindrical electric discharge tubes of the mercury vapor type generating an emission of ultra-violet rays of 2537 angstroms wavelength, said tubes being connected in series and located in the gap left between said two plates, at least outlet means for providing communication between the interior of said flat chamber and the outside, and electrical heating resistances located at said outlet and heated to a temperature of about 250° C.

11. A lighting device acting as a photoluminescent lamp and comprising a casing, a relatively flat chamber contained in said casing and formed with two opposite, relatively closely spaced walls consisting of two substantially plane and parallel plates leaving a gap therebetween and coated on their confronting inner faces respectively with a phosphor-forming layer of fluorescent material of stable and inorganic origin, selected to have its maximum photosensitivity for the radiation of 2537 angstroms wavelength and a high neutral reflection factor for a wide range of the spectrum up to the ultra-violet region thereof, at least one of said plates forming a window in the wall of said casing and being made of light-diffusing translucent glass selected from the group including ground glasses and opaline glasses, the thickness of the phosphor-forming layer on said translucent plate ranging from 10 to 30 microns, a source of electromagnetic radiations consisting of a set of at least one group of cylindrical electric discharge tubes of the mercury vapor type generating an emission of ultra-violet rays of 2537 angstroms wavelength, said tubes being coated externally throughout their length and over at least one portion of their periphery with a layer of said phosphor-forming material, the tubes of each group being connected in series and located in the gap left between said two plates, duct means laterally surrounding and formed integral with said casing to constitute an annular jacket, inlet means in said duct opening into the outer atmosphere, baffle means whereby said duct communicates with the inner space of said casing through said chamber, outlet means in said casing for providing communication between said inner space and the outside, fan means for effecting forced circulation of air, whereby cooling air is drawn inwards from the outside through said inlet means, said jacket, said chamber and said casing and discharged outwards through said outlet means and electrical heating resistances located at said outlet and heated up to a temperature of about 250° C.

12. A lighting device acting as a photoluminescent lamp for photographic and printing reproduction purposes and comprising a first substantially flat plate of opaque sheet material, a second substantially flat plate of light-diffusing translucent glass selected from the group including ground glasses and opaline glasses, and arranged substantially parallel to and in relatively closely spaced relationship with said first plate, the confronting inner faces of both plates being coated with a layer of fluorescent substances for said second plate, said substances being selected to have their maximum photosensitivity for the 2537 angstroms wavelength radiation and, at least for said first plate, a high neutral reflection factor for a wide range of the spectrum up to the ultra-violet region thereof, a casing enclosing both of said plates and wherein at least said second plate forms a window in a wall of said casing whereby said plates are each one removably supported within said casing, a set of substantially straight cylindrical illuminating electric discharge tubes of the mercury vapor type arranged in parallel side-by-side contiguous relationship to form a flat continuous array located between said plates in parallel spaced relation thereto, said tube being electrically interconnected so as to form two separate tube circuits of mutually imbricated tubes whereby the tubes of each circuit are connected in series, two successive tubes of one circuit being separated by one tube of the other circuit and each circuit being individually energized through a static transformer and a current phase-shifting device and controllable cooling means adapted to effect a true forced circulation of air directly about said tubes.

13. A device according to claim 12, wherein said tubes have their lateral walls coated externally with a layer of said fluorescent substances throughout their useful length and over at least one portion of their cross-sectional periphery.

14. A device according to claim 13, wherein said tubes are coated with said fluorescent substances over only that portion of their cross-sectional periphery which substantially faces said first plate.

15. A device according to claim 14, wherein said tubes have an oval-shaped flattened cross-section with a substantially lenticular contour, the longitudinal plane of greatest cross-sectional width being substantially parallel to said plates.

16. A device according to claim 12, wherein said plates are spaced at most 50 mm. apart and said tubes have a small diameter at least equal to about 15 mm. and are spaced about 8 mm. from said first plate and about 16 mm. from said second plate, said tubes operating with the highest possible current intensity ranging from .45 to 1.2 amperes.

17. A device according to claim 12 wherein said first plate has a front face facing said second plate and an opposite rear face, whereby a free space is left inside of said casing and behind said first plate, the rear face of which is turned towards said free space, and said cooling means comprise air-outlet means provided on said casing substantially in front of the rear face of said first plate, air-exhausting fan means mounted at said outlet means, air-inlet means provided on said casing and opening therein in the vicinity of the interval between said plates, and baffle means located in the path of ventilating air between said inlet means and the inside of said casing.

18. A device according to claim 17 comprising duct means laterally surrounding and formed integral with said casing to constitute an annular jacket opening on the one hand into the outer atmosphere and on the other hand into said casing whereby said duct means form said air inlet means, whereas said casing is provided with an inner partition extending substantially parallel with said plates and formed with a central aperture the edge of which extends somewhat within the interval between said plates, so as to provide a baffled passage between said inlet means and the inside of said casing.

19. A device according to claim 17, wherein said tubes have an oval-shaped flattened cross-section with a substantially lenticular contour, the longitudinal plane of greatest cross-sectional width being substantially parallel to said plates and said tubes being coated externally.

20. A device according to claim 12, comprising means for destroying the ozone produced during the operation of said tubes.

21. A device according to claim 20 wherein said ozone destroying means consist of electrical heating resistors heated up to a temperature of about 250° C. and located in the stream of air flowing from said tubes.

References Cited in the file of this patent

UNITED STATES PATENTS

| | | |
|---|---|---|
| 1,281,754 | Beck | Oct. 15, 1918 |
| 2,252,562 | Ganley | Aug. 12, 1941 |
| 2,457,503 | Singer | Dec. 28, 1948 |
| 2,726,587 | Bartley | Dec. 13, 1955 |